(12) United States Patent
Ishida et al.

(10) Patent No.: US 11,189,848 B2
(45) Date of Patent: Nov. 30, 2021

(54) FUEL CELL METAL SEPARATOR AND FUEL CELL

(71) Applicant: HONDA MOTOR CO., LTD., Tokyo (JP)

(72) Inventors: Kentaro Ishida, Wako (JP); Hiroshi Morikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 345 days.

(21) Appl. No.: 16/191,972

(22) Filed: Nov. 15, 2018

(65) Prior Publication Data

US 2019/0157690 A1    May 23, 2019

(30) Foreign Application Priority Data

Nov. 17, 2017   (JP) .............................. JP2017-221816

(51) Int. Cl.

| | |
|---|---|
| *H01M 8/0267* | (2016.01) |
| *H01M 8/026* | (2016.01) |
| *H01M 8/0265* | (2016.01) |
| *H01M 8/04014* | (2016.01) |
| *H01M 8/1004* | (2016.01) |

(Continued)

(52) U.S. Cl.
CPC ......... *H01M 8/0267* (2013.01); *H01M 8/026* (2013.01); *H01M 8/0206* (2013.01); *H01M 8/0265* (2013.01); *H01M 8/04007* (2013.01); *H01M 8/04014* (2013.01); *H01M 8/1004* (2013.01); *H01M 8/241* (2013.01)

(58) Field of Classification Search
CPC ... H01M 8/026; H01M 8/0265; H01M 8/0267
See application file for complete search history.

(56) References Cited

U.S. PATENT DOCUMENTS

| 7,718,293 B2 | 5/2010 | Ströbel et al. |
| 2004/0106028 A1 | 6/2004 | Sugiura et al. |

(Continued)

FOREIGN PATENT DOCUMENTS

| DE | 202014008157 U1 * | 1/2016 | .......... H01M 8/0271 |
| JP | 2004-193110 A | 7/2004 | |

(Continued)

OTHER PUBLICATIONS

Office Action dated Jun. 25, 2019 issued over the corresponding Japanese Patent Application No. 2017-221816 with the English translation thereof.

(Continued)

*Primary Examiner* — Stephan J Essex (74) *Attorney, Agent, or Firm* — Carrier Blackman & Associates, P.C.; Joseph P. Carrier; William D. Blackman (57) ABSTRACT

An oxygen-containing gas flow field and an inner bead (or a bead seal) are formed on one surface of a first metal separator, and a coolant flow field as a passage of a coolant is formed on the other surface of the first metal separator. Further, a coolant supply passage and a coolant discharge passage extend through the first metal separator in a separator thickness direction. An in-bead channel as a passage of the coolant is formed by a recess on the back side of the inner bead. A narrowed segment is provided in a part of the in-bead channel. The channel cross sectional area of the narrowed segment is smaller than those of other segments.

9 Claims, 8 Drawing Sheets

(51) Int. Cl.
    *H01M 8/241*     (2016.01)
    *H01M 8/04007*     (2016.01)
    *H01M 8/0206*     (2016.01)

(56) References Cited

U.S. PATENT DOCUMENTS

| | | |
|---|---|---|
| 2007/0154758 A1 | 7/2007 | Kikuchi et al. |
| 2016/0301088 A1 | 10/2016 | Freese |
| 2019/0013528 A1 | 1/2019 | Kageyama et al. |

FOREIGN PATENT DOCUMENTS

| | | |
|---|---|---|
| JP | 2007134206 A | 5/2007 |
| WO | 2016055510 A1 | 4/2016 |
| WO | 2017013710 A1 | 1/2017 |

OTHER PUBLICATIONS

Search Report dated Jul. 3, 2019 issued over the corresponding German Patent Application No. 10 2018 219 506.4 with the English translation thereof.

Office Action dated Jul. 8, 2019 issued over the corresponding German Patent Application No. 10 2018 219 506.4 with the English translation thereof.

\* cited by examiner

FUEL CELL METAL SEPARATOR AND FUEL CELL

CROSS-REFERENCE TO RELATED APPLICATION

This application is based upon and claims the benefit of priority from Japanese Patent Application No. 2017-221816 filed on Nov. 17, 2017, the contents of which are incorporated herein by reference.

BACKGROUND OF THE INVENTION

Field of the Invention

The present invention relates to a fuel cell metal separator and a fuel cell.

Description of the Related Art

In general, a solid polymer electrolyte fuel cell adopts a solid polymer electrolyte membrane. The solid polymer electrolyte membrane is a polymer ion exchange membrane. The fuel cell includes a membrane electrode assembly (MEA) formed by providing an anode on one surface of the solid polymer electrolyte membrane, and a cathode on the other surface of the solid polymer electrolyte membrane. The membrane electrode assembly is sandwiched between separators (bipolar plates) to form a power generation cell (unit cell). In use, a predetermined number of power generation cells are stacked together to form, e.g., an in-vehicle fuel cell stack mounted in a vehicle.

In the power generation cell, for example, as the separators, metal separators may be used, as in the case of Japanese Laid-Open Patent Publication No. 2004-193110. In Japanese Laid-Open Patent Publication No. 2004-193110, two metal separator plates are joined together to form a single joint separator. In the structure, a coolant flow field as a passage of a coolant is formed between the two metal separator plates, along the separator surfaces. A coolant supply passage and a coolant discharge passage connected to the coolant flow field extend through the metal separators. According to the disclosure of the specification of U.S. Pat. No. 7,718,293, in order to reduce production cost, as a seal, a ridge shaped bead seal is formed in a metal separator by press forming.

SUMMARY OF THE INVENTION

In the case where a reactant gas flow field and a bead seal is formed on one surface of a metal separator, and a coolant flow field is formed on the other surface of the metal separator, a channel is formed (in a recess) on the back of the ridge shaped bead seal, and a coolant flows through the channel. Therefore, the coolant bypasses from the coolant supply passage to the coolant discharge passage through the channel. As a result, the flow rate of the coolant flowing through the coolant flow field is reduced, and the cooling efficiency lowered.

The present invention has been made taking such a problem into consideration, and an object of the present invention is to provide a fuel cell metal separator and a fuel cell which make it possible to reduce the flow rate of the coolant bypassing from a coolant supply passage to a coolant discharge passage through a channel on the back of a bead seal.

In order to achieve the above object, the present invention provides a fuel cell metal separator. A reactant gas flow field as a passage of reactant gas comprising a fuel gas or an oxygen-containing gas and a ridge shaped bead seal around the reactant gas flow field configured to prevent leakage of the reactant gas are formed on one surface of the fuel cell metal separator, a coolant flow field as a passage of a coolant is formed on another surface of the fuel cell metal separator, a coolant supply passage is connected to the coolant flow field and a coolant discharge passage is connected to the coolant flow field, the coolant supply passage and the coolant discharge passage extend through the fuel cell metal separator in a separator thickness direction, and an in-bead channel as a passage of the coolant is formed by a recess on a back side of a ridge shape of the bead seal. The in-bead channel is configured to connect the coolant supply passage and the coolant discharge passage, and a narrowed segment having a channel cross sectional area smaller than those of other segments is formed in a part of the in-bead channel.

Preferably, the narrowed segment may be formed by filling filler material in the part of the in-bead channel.

Preferably, a ratio of a cross sectional area of the filler material to a cross sectional area of the in-bead channel may be not more than 70%.

Preferably, the bead seal may include a pair of extensions extending in a flow field direction of the reactant gas flow field, at both ends of the fuel cell metal separator in a flow field width direction of the reactant gas flow field, and the narrowed segment is provided on a back side of each of the pair of extensions.

Preferably, the in-bead channel may be connected to an air release passage extending through the fuel cell metal separator in the separator thickness direction.

Preferably, the in-bead channel may be connected to a coolant drain passage extending through the fuel cell metal separator in the separator thickness direction.

Further, the present invention provides a fuel cell. The fuel cell includes a membrane electrode assembly and fuel cell metal separators provided on both sides of the membrane electrode assembly. A reactant gas flow field as a passage of reactant gas comprising a fuel gas or an oxygen-containing gas and a ridge shaped bead seal around the reactant gas flow field configured to prevent leakage of the reactant gas are formed on one surface of each of the fuel cell metal separators, a coolant flow field as a passage of a coolant is formed on another surface of each of the fuel cell metal separators, a coolant supply passage is connected to the coolant flow field and a coolant discharge passage is connected to the coolant flow field, the coolant supply passage and the coolant discharge passage extend through the fuel cell metal separators in a separator thickness direction, and an in-bead channel as a passage of the coolant is formed by a recess on a back side of a ridge shape of the bead seal. The in-bead channel is configured to connect the coolant supply passage and the coolant discharge passage, and a narrowed segment having a channel cross sectional area smaller than those of other segments is formed in a part of the in-bead channel.

In the fuel cell metal separator and the fuel cell of the present invention, since the narrowed segment is provided in a part of the in-bead channel, it is possible to reduce the bypass flow rate of the coolant bypassing from the coolant supply passage to the coolant discharge passage. Accordingly, it is possible to increase the flow rate of the coolant flowing through the coolant flow field, and cool the heat generating area efficiently. Further, since the cooling efficiency is improved, size reduction of the cooling system is achieved.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell metal separator and a fuel cell according to the present invention will be described with reference to the accompanying drawings.

Figure 1:
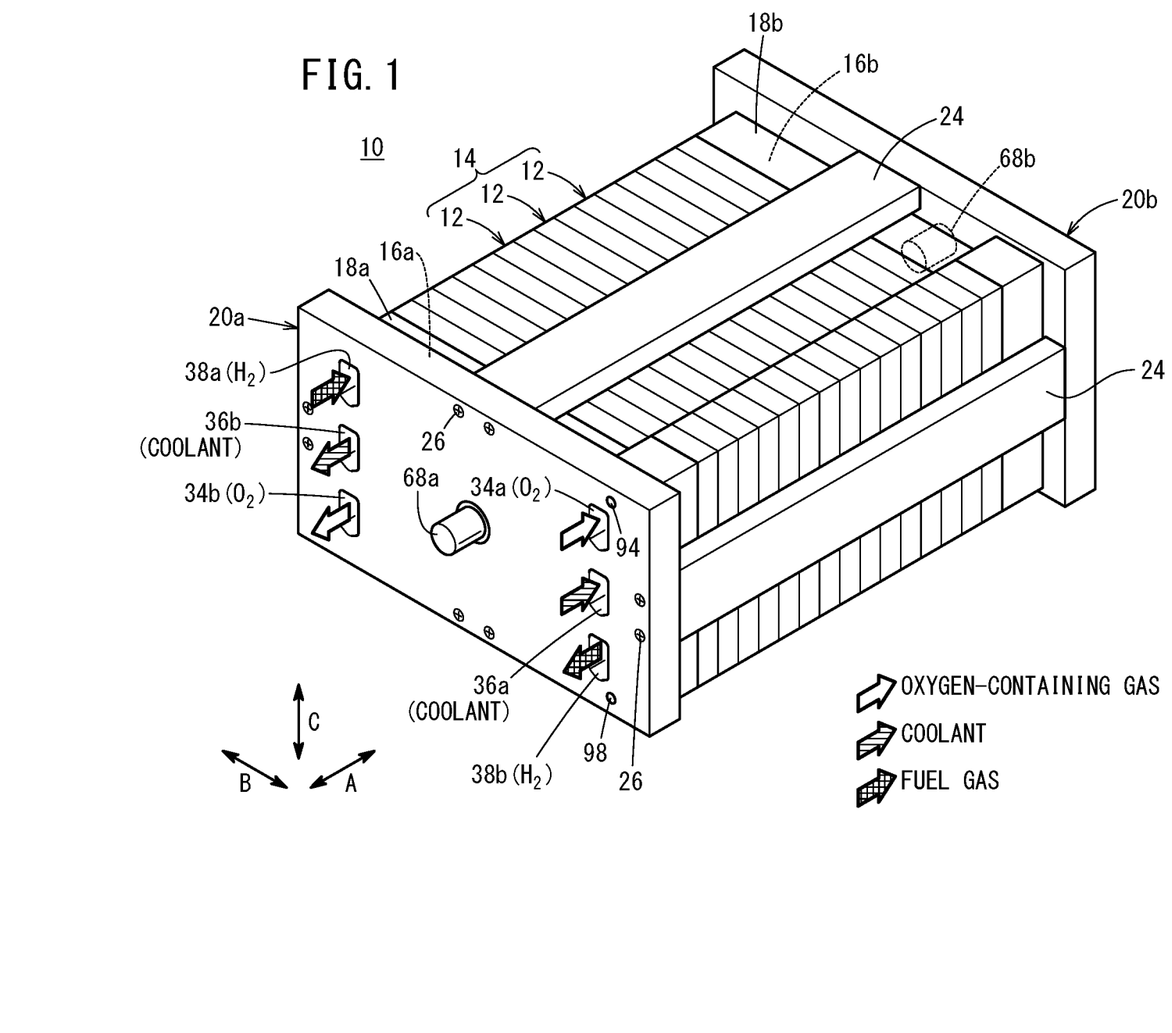
FIG. 1 is a perspective view showing a fuel cell stack.

As shown in FIG. 1, a fuel cell stack 10 includes a stack body 14 formed by stacking a plurality of power generation cells 12 as units of fuel cells in a horizontal direction (indicated by an arrow A). For example, the fuel cell stack 10 is mounted in a fuel cell vehicle such as a fuel cell electric automobile (not shown).

At one end of the stack body 14 in the stacking direction indicated by the arrow A, a terminal plate 16a is provided. An insulator 18a is provided outside the terminal plate 16a. Further, an end plate 20a is provided outside the insulator 18a. At the other end of the stack body 14 in the stacking direction, a terminal plate 16b is provided. An insulator 18b is provided outside the terminal plate 16b. Further, an end plate 20b is provided outside the insulator 18b. Coupling bars 24 are positioned between the sides of the end plates 20a, 20b. The terminal plates 16a, 16b are made of electrically conductive material, and terminals 68a, 68b are provided at substantially the central positions of the terminal plates 16a, 16b. The terminals 68a, 68b extend outward in the stacking direction.

Each of the end plates 20a, 20b has a laterally elongated (or longitudinally elongated) rectangular shape. The coupling bars 24 are positioned between the sides of the end plates 20a, 20b. Both ends of the coupling bars 24 are fixed to inner surfaces of the end plates 20a, 20b through bolts 26 to apply a tightening load to the plurality of stacked power generation cells 12 in the stacking direction indicated by the arrow A. It should be noted that the fuel cell stack 10 may have a casing including the end plates 20a, 20b, and the stack body 14 may be placed in the casing.

Figure 2:
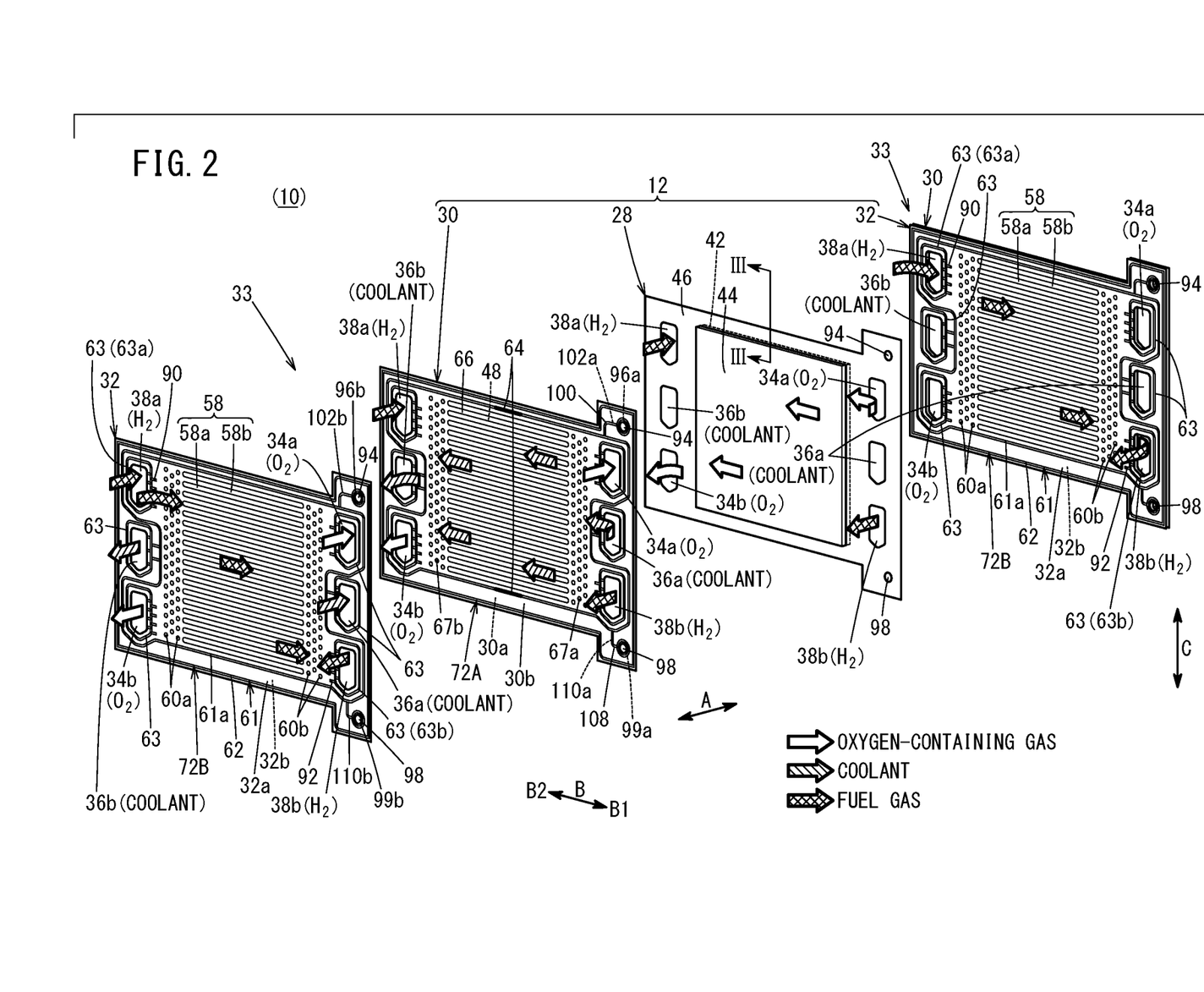
FIG. 2 is an exploded perspective view showing a power generation cell of the fuel cell stack.

As shown in FIG. 2, each of the power generation cells 12 includes a resin film equipped MEA 28, a first metal separator 30 provided on one surface of the resin film equipped MEA 28, and a second metal separator 32 provided on the other surface of the resin film equipped MEA 28. For example, the plurality of power generation cells 12 are stacked together in a direction indicated by the arrow A (horizontal direction) or in a direction indicated by an arrow C (gravity direction), and a tightening load (compression load) is applied to the power generation cells 12 to form the fuel cell stack 10. For example, the fuel cell stack 10 is mounted as an in-vehicle fuel cell stack, in a fuel cell electric automobile (not shown).

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. The first metal separator 30 of one of the adjacent power generation cells 12 and the second metal separator 32 of the other of the adjacent power generation cells 12 are joined together to form a joint separator 33.

At one end of the power generation cell 12 in a longitudinal direction indicated by an arrow B1 (horizontal direction), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction indicated by the arrow A. The oxygen-containing gas supply passage 34a, the coolant supply passage 36a, and the fuel gas discharge passage 38b are arranged in the vertical direction indicated by the arrow C. An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction indicated by an arrow B2, a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limited to the above embodiment, and may be changed depending on the required specification.

Figure 3:
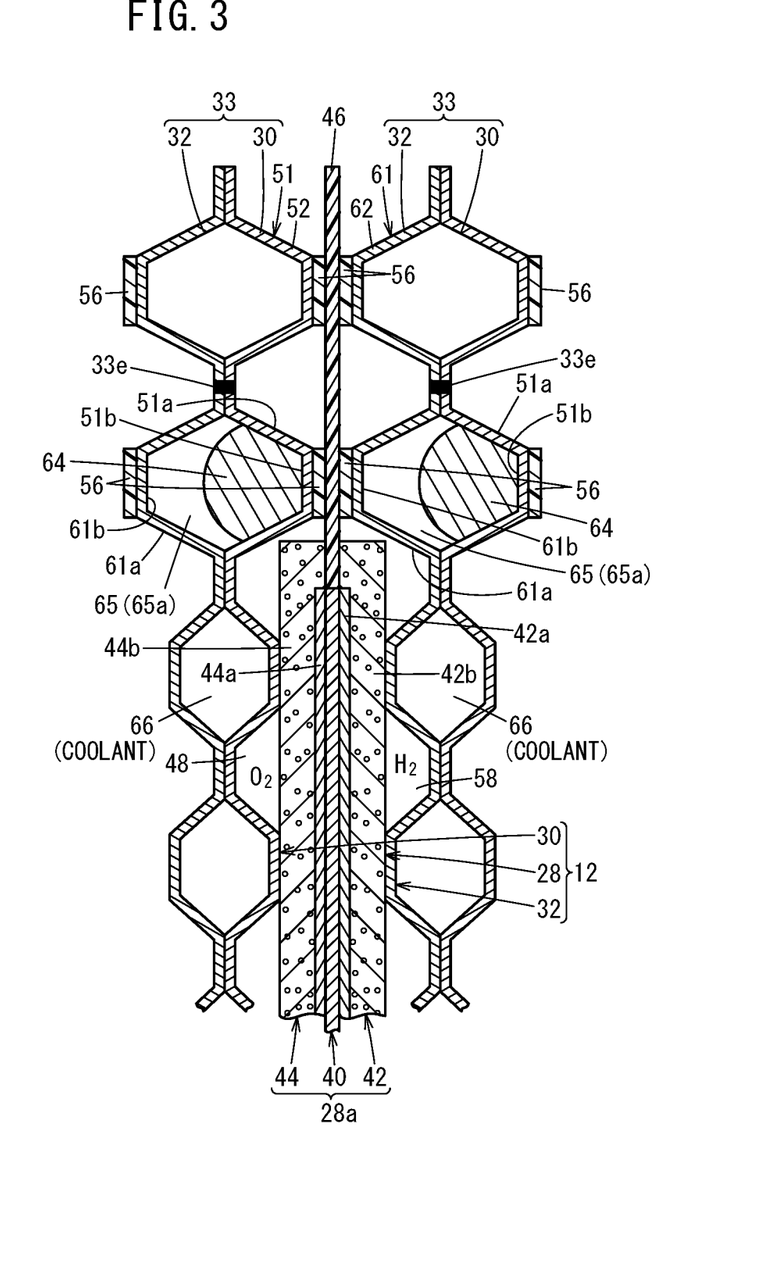
FIG. 3 is a cross sectional view showing the power generation cell taken along a line III-III in FIG. 2.

As shown in FIG. 3, the resin film equipped MEA 28 includes a membrane electrode assembly 28a, and a frame shaped resin film 46 provided in the outer portion of the membrane electrode assembly 28a. The membrane electrode assembly 28a includes an electrolyte membrane 40, and an anode 42 and a cathode 44 sandwiching the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a stacked on the other surface of the electrolyte membrane 40, and a second gas diffusion layer 42b stacked on the second electrode catalyst layer 42a.

The inner end surface of the resin film 46 is positioned close to, overlapped with, or contacts the outer end surface of the electrolyte membrane 40. As shown in FIG. 2, at one end of the resin film 46 in the direction indicated by the arrow B1, the oxygen-containing gas supply passage 34a, the coolant supply passage 36a, and the fuel gas discharge passage 38b are provided. At the other end of the resin film 46 in the direction indicated by the arrow B2, the fuel gas supply passage 38a, the coolant discharge passage 36b, and the oxygen-containing gas discharge passage 34b are provided.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the electrolyte membrane 40 may be configured to protrude outward without using the resin film 46. Alternatively, a frame shaped film may be provided on both sides of the electrolyte membrane 40 which protrudes outward.

Figure 4:
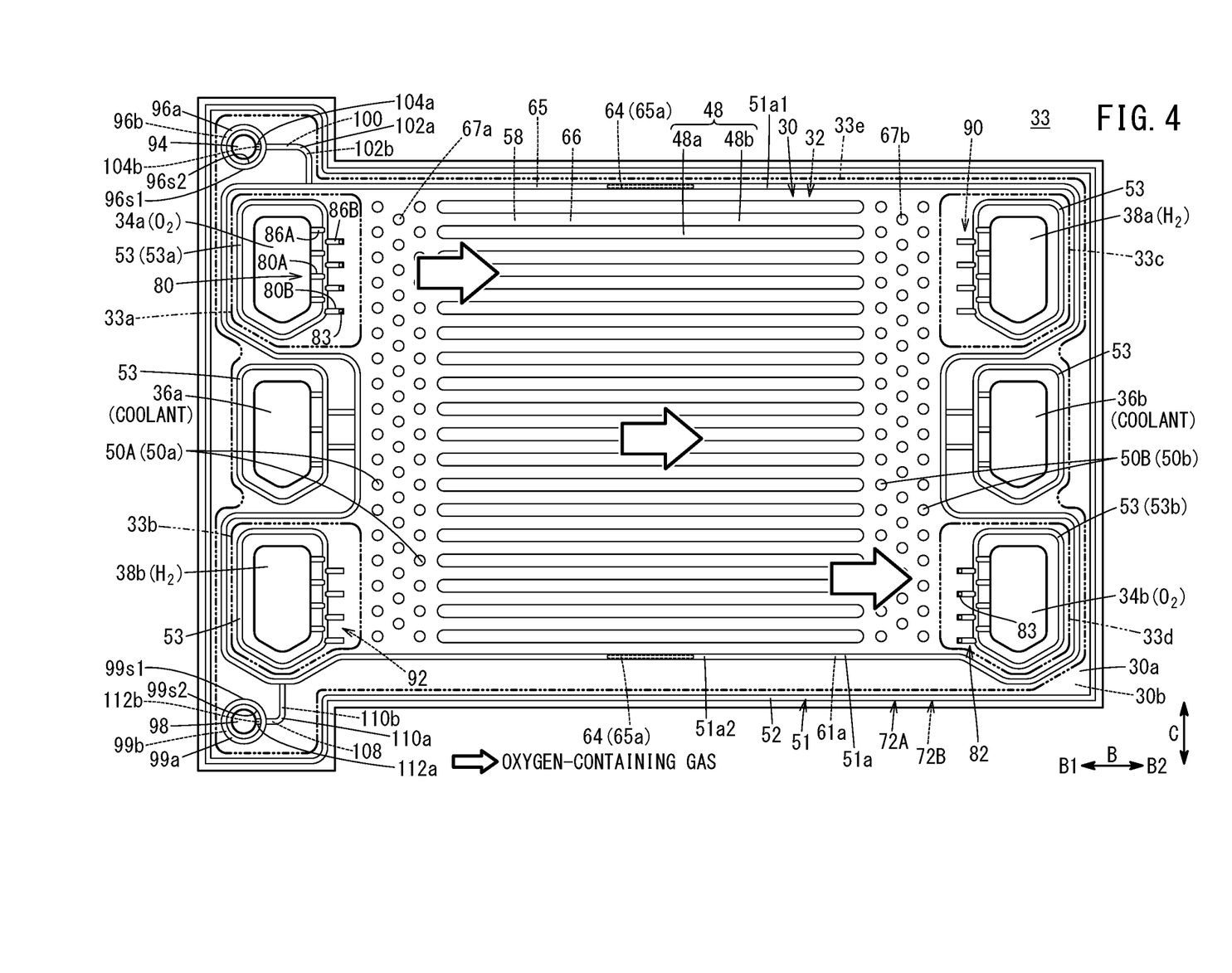
FIG. 4 is a front view showing a joint separator as viewed from a first metal separator plate.

As shown in FIG. 4, an oxygen-containing gas flow field 48 is provided on a surface 30a of the first metal separator 30 facing the resin film equipped MEA 28 (hereinafter referred to as the "surface 30a"). For example, the oxygen-containing gas flow field 48 extends in the direction indicated by the arrow B.

The oxygen-containing gas flow field 48 is connected to (in fluid communication with) the oxygen-containing gas supply passage 34a and the oxygen-containing gas discharge passage 34b. The oxygen-containing gas flow field 48 includes a plurality of straight flow grooves 48b formed between a plurality of ridges 48a extending in the direction indicated by the arrow B. Instead of the plurality of straight flow grooves 48b, a plurality of wavy flow grooves may be provided.

An inlet buffer 50A is provided on the surface 30a of the first metal separator 30, between the oxygen-containing gas supply passage 34a and the oxygen-containing gas flow field 48. The inlet buffer 50A includes a plurality of boss arrays each including a plurality of bosses 50a protruding from the surface 30a and arranged in a direction indicated by an arrow C. Further, an outlet buffer 50B is provided on the surface 30a of the first metal separator 30, between the oxygen-containing gas discharge passage 34b and the oxygen-containing gas flow field 48. The outlet buffer 50B includes a plurality of boss arrays each including a plurality of bosses 50b protruding from the surface 30a and arranged in the direction indicated by the arrow C.

On a surface 30b of the first metal separator 30 opposite to the oxygen-containing gas flow field 48, boss arrays each including a plurality of bosses 67a protruding from the surface 30b and arranged in the direction indicated by the arrow C are provided between the boss arrays of the inlet buffer 50A, and boss arrays each including a plurality of bosses 67b protruding from the surface 30b and arranged in the direction indicated by the arrow C are provided between the boss arrays of the outlet buffer 50B. The bosses 67a, 67b form a buffer on the coolant surface.

A first bead 72A including a first seal line 51 (seal bead) is formed on the surface 30a of the first metal separator 30 by press forming. The first bead 72A is expanded toward the resin film equipped MEA 28 (FIG. 2). As shown in FIG. 3, resin material 56 is fixed to protruding front surfaces of the first seal line 51 by printing, coating, etc. For example, polyester fiber may be used as the resin material 56. The resin material 56 may be provided on the part of the resin film 46. The resin material 56 is not essential. The resin material 56 may be dispensed with.

As shown in FIG. 4, the first seal line 51 includes a bead seal 51a (hereinafter referred to as the "inner bead 51a") provided around the oxygen-containing gas flow field 48, the inlet buffer 50A, and the outlet buffer 50B, a bead seal 52 (hereinafter referred to as the "outer bead 52") provided outside the inner bead 51a, along the outer peripheral portion of the first metal separator 30, and a plurality of bead seals 53 (hereinafter referred to as the "passage beads 53") provided around the plurality of fluid passages (oxygen-containing gas supply passage 34a, etc.).

The inner bead 51a includes a pair of extensions 51a1, 51a2 extending in the flow field direction of the oxygen-containing gas flow field 48 (in the direction indicated by the arrow B), at both ends of the first metal separator 30 in the flow field width direction of the oxygen-containing gas flow field 48 (in the direction indicated by the arrow C). Specifically, at an upper end of the first metal separator 30 in the vertical direction, the extension 51a1 (one of the extensions) extends in a longitudinal direction of the substantially rectangular first metal separator 30. At a lower end of the first metal separator 30 in the vertical direction, the extension 51a2 (the other of the extensions) extends in the longitudinal direction of the substantially rectangular first metal separator 30.

The outer bead 52 protrudes from the surface 30a of the first metal separator 30 toward the MEA 28, and the outer bead 52 is provided around the outer marginal portion of the surface 30a of the first metal separator 30.

The plurality of passage beads 53 protrude from the surface 30a of the first metal separator 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b". The first metal separator 30 has bridge sections 80, 82 connecting the inside of the passage beads 53a, 53b (fluid passages 34a, 34b) and the outside (oxygen-containing gas flow field 48) of the passage beads 53a, 53b.

The bridge section 80 is provided on a side part of the passage bead 53a formed around the oxygen-containing gas supply passage 34a, adjacent to the oxygen-containing gas flow field 48. The bridge section 82 is provided on a side part of the passage bead 53b formed around the oxygen-containing gas discharge passage 34b, adjacent to the oxygen-containing gas flow field 48.

The passage bead 53a and the passage bead 53b have the same structure. Further, the bridge section 80 of the oxygen-containing gas supply passage 34a and the bridge section 82 of the oxygen-containing gas discharge passage 34b have the same structure. Therefore, hereinafter, structure of the passage bead 53a and the bridge section 80 as representative examples will be described in detail, and the detailed description about structure of the passage bead 53b and the bridge section 82 will be omitted.

The bridge section 80 includes a plurality of inner bridges 80A provided at intervals inside the passage bead 53a, and a plurality of outer bridges 80B provided at intervals outside the passage bead 53a. Each of the inner bridges 80A includes an inner tunnel 86A protruding from the passage bead 53a toward the oxygen-containing gas supply passage 34a. The inner bridge 80A is opened to the oxygen-containing gas supply passage 34a. Each of the outer bridges 80B includes an outer tunnel 86B protruding from the passage bead 53a toward the oxygen-containing gas flow field 48. A hole 83 is formed at the front end of the outer tunnel 86B. The inner tunnel 86A and the outer tunnel 86B are formed by press forming to protrude toward the resin film equipped MEA 28. The internal space as a recess formed on the back side of each of the inner tunnel 86A and the outer tunnel 86B is connected to the internal space as a recess on the back side of the passage bead 53a to form a passage of the oxygen-containing gas.

In the embodiment of the present invention, the plurality of inner bridges 80A and the plurality of outer bridges 80B are arranged alternately along the passage bead 53a (in a zigzag pattern). It should be noted that the plurality of inner bridges 80A and the plurality of outer bridges 80B may be provided oppositely through the passage bead 53a.

Figure 5:
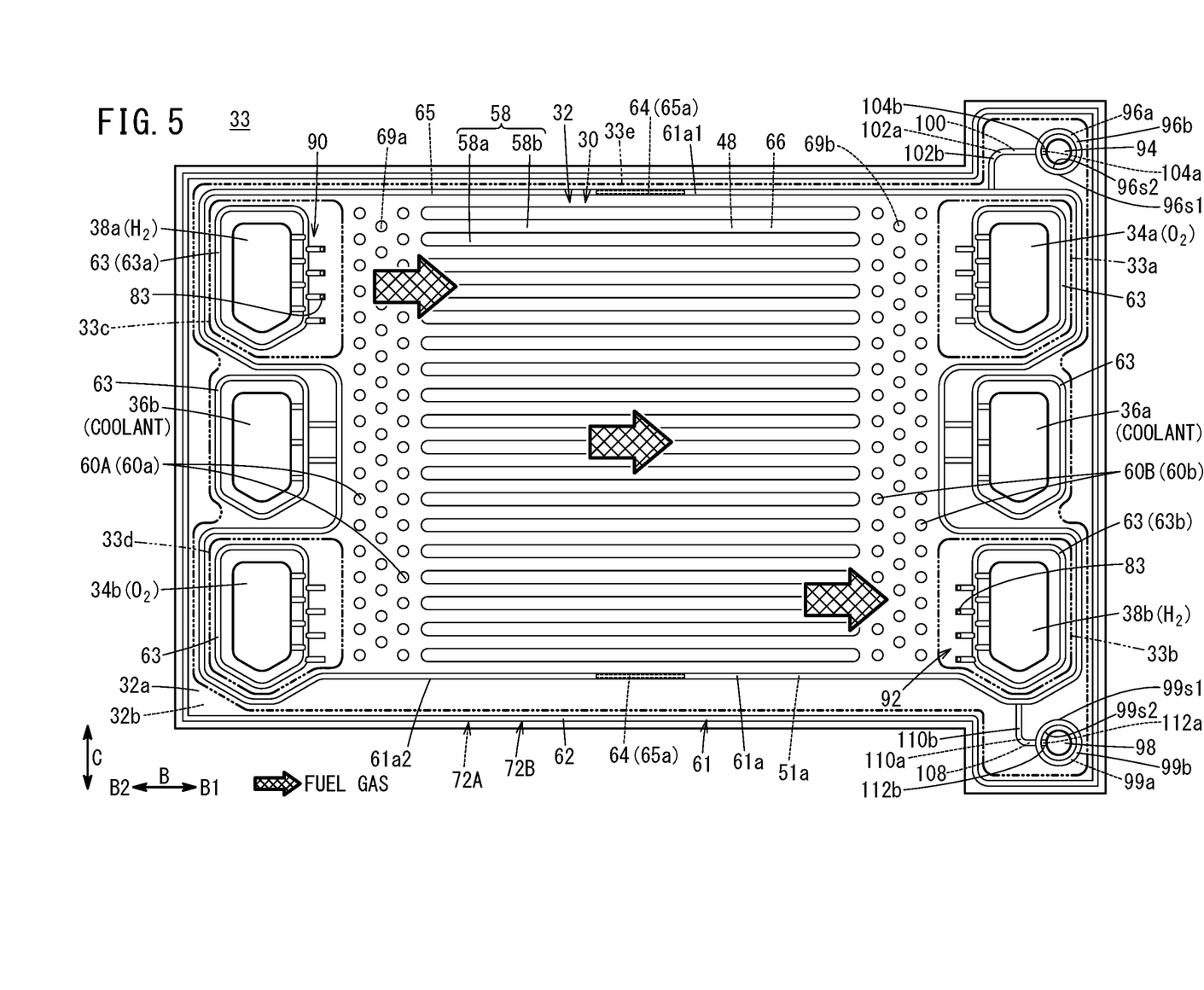
FIG. 5 is a front view showing the joint separator as viewed from a second metal separator plate.

As shown in FIG. 5, the second metal separator 32 has a fuel gas flow field 58 on its surface 32a facing the resin film equipped MEA 28 (hereinafter referred to as the "surface 32a"). For example, the fuel gas flow field 58 extends in the direction indicated by the arrow B. The fuel gas flow field 58 is connected to (in fluid communication with) the fuel gas supply passage 38a and the fuel gas discharge passage 38b. The fuel gas flow field 58 includes a plurality of straight flow grooves 58b formed between a plurality of ridges 58a extending in the direction indicated by the arrow B. Instead of the plurality of straight flow grooves 58b, a plurality of wavy flow grooves may be provided.

An inlet buffer 60A is provided on the surface 32a of the second metal separator 32, between the fuel gas supply passage 38a and the fuel gas flow field 58. The inlet buffer 60A includes a plurality of boss arrays each including a plurality of bosses 60a protruding from the surface 32a and arranged in a direction indicated by an arrow C. Further, an outlet buffer 60B is provided on the surface 32a of the second metal separator 32, between fuel gas discharge passage 38b and the fuel gas flow field 58. The outlet buffer 60B includes a plurality of boss arrays each including a plurality of bosses 60b protruding from the surface 32a and arranged in the direction indicated by the arrow C.

On a surface 32b of the second metal separator 32 opposite to the fuel gas flow field 58, boss arrays each including a plurality of bosses 69a protruding from the surface 32b and arranged in the direction indicated by the arrow C are provided between the boss arrays of the inlet buffer 60A, and boss arrays each including a plurality of bosses 69b protruding from the surface 32b and arranged in the direction indicated by the arrow C are provided between the boss arrays of the outlet buffer 60B. The bosses 69a, 69b form a buffer on the coolant surface.

A second bead 72B including a second seal line 61 (seal bead) is formed on the surface 32a of the second metal separator 32 by press forming. The second bead 72B is expanded toward the resin film equipped MEA 28.

As shown in FIG. 3, resin material 56 is fixed to each of protruding front end surfaces of the second seal line 61 by printing, coating, etc. For example, polyester fiber may be used as the resin material 56. The resin material 56 may be provided on the part of the resin film 46. The resin material 56 is not essential. The resin material 56 may be dispensed with.

As shown in FIG. 5, the second seal line 61 includes a bead seal 61a (hereinafter referred to as the "inner bead 61a") provided around the fuel gas flow field 58, the inlet buffer 60A, and the outlet buffer 60B, a bead seal 62 (hereinafter referred to as the "outer bead 62") provided outside the inner bead 61a, along the outer peripheral portion of the second metal separator 32, and a plurality of bead seals 63 (hereinafter referred to as the passage beads 63") provided around the plurality of fluid passages (fluid passage 38a, etc.)

The inner bead 61a includes a pair of extensions 61a1, 61a2 extending in the flow field direction of the fuel gas flow field 58 (in the direction indicated by the arrow B), at both ends of the second metal separator 32 in the flow field width direction of the fuel gas flow field 58 (in the direction indicated by the arrow C). Specifically, at an upper end of the second metal separator 32 in the vertical direction, the extension 61a1 (one of the extensions) extends in a longitudinal direction of the substantially rectangular second metal separator 32. At a lower end of the second metal separator 32 in the vertical direction, the extension 61a2 (the other of the extensions) extends in the longitudinal direction of the substantially rectangular second metal separator 32.

The outer bead 62 protrudes from the surface 32a of the second metal separator 32 and the outer bead 62 is provided around the outer marginal portion of the surface 32a of the second metal separator 32.

The plurality of passage beads 63 protrude from the surface 32a of the second metal separator 32. The passage beads 63 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

The second metal separator 32 has bridge sections 90, 92 connecting the inside (fluid passages 38a, 38b) of the passage beads 63a, 63b provided around the fuel gas supply passage 38a and the fuel gas discharge passage 38b, respectively, and the outside (fuel gas flow field 58) of the passage beads 63a, 63b.

The bridge section 90 is provided on a side part of the passage bead 63a formed around the fuel gas supply passage 38a, adjacent to the fuel gas flow field 58. The bridge section 92 is provided on a side part of the passage bead 63b formed around the fuel gas discharge passage 38b, adjacent to the fuel gas flow field 58.

The bridge sections 90, 92 provided in the second metal separator 32 have the same structure as the above described bridge sections 80, 82 (FIG. 4) provided in the first metal separator 30. The passage beads 63a, 63b have the same structure and the layout as the above described passage beads 53a, 53b (FIG. 4).

As shown in FIG. 2, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking a back surface of the first metal separator 30 (the back side of the oxygen-containing gas flow field 48) and a back surface of the second metal separator 32 (the back side of the fuel gas flow field 58) together.

As shown in FIG. 3, an in-bead channel 65 is formed by a recess 51b formed on the back side of the ridge shaped inner bead 51a provided in the first metal separator 30, and a recess 61b formed on the back side of the ridge shaped inner bead 61a provided in the second metal separator 32. The first and second metal separators 31, 32 may also be referred to as first and second separator plates 31, 32. In the practice of the present invention, and as shown in FIG. 3, portions of the first and second separator plates 31, 32 on both sides of the bead seal 52, and immediately adjacent the bead seal, are in abutting contact with one another. The preceding sentence refers to both sides of the bead seal in the direction of the arrow C in FIG. 4, and also to the portions of the separator above and below the bead seal 52 as shown in FIG. 3. The coolant flows through the in-bead channel 65 from the coolant supply passage 36a to the coolant discharge passage 36b (see FIG. 2, etc.). A narrowed segment 65a is provided in a part of the in-bead channel 65. The narrowed segment 65a has a channel sectional area which is smaller than those of other segments. In the in-bead channel 65, the narrowed segment 65a is provided in a part extending along the coolant flow field 66. The narrowed segment 65a is formed by filling filler material 64 in a part of the in-bead channel 65. The filler material 64 extends along the in-bead channel 65.

In the embodiment of the present invention, the filler material 64 is filled in the recess 51b on the back side of the inner bead 51a of the first metal separator 30. The filler material 64 is spaced from the second metal separator 32. That is, the filler material 64 does not contact the recess 61b facing the recess 51b. Preferably, the ratio of the cross sectional area of the filler material 64 to the cross sectional area of the in-bead channel 65 is not more than 70%. The ratio is based on the state where no tightening load is applied to the joint separator 33. Preferably, the ratio of the cross sectional area of the filler material 64 to the cross sectional area of the in-bead channel 65 is not less than 40%. The filler material 64 is spread beyond the boundary surface between the first metal separator 30 and the second metal separator 32, and the filler material 64 partially enters the recess 61b of the second metal separator 32.

Instead of adopting the above structure, the filler material 64 may be filled in the recess 61b on the back side of the inner bead 61a of the second metal separator 32. In this case, preferably, the filler material 64 is spread beyond the boundary surface between the first metal separator 30 and the second metal separator 32, and the filler material 64 partially enters the recess 51b of the first metal separator 30. The filler material 64 may be filled in both of the recess 51b and the recess 61b to form the narrowed segment 65a.

As shown in FIG. 4, the filler material 64 forming the narrowed segment 65a is provided on the back side of each of the pair of extensions 51a1, 51a2 of the inner bead 51a (on the back of each of the pair of extensions 61a1, 61a2 shown in FIG. 5). The narrowed segment 65a is provided at least in a part of the extensions 51a1, 51a2 in the direction in which the extensions 51a1, 51a2 extend. In the embodiment of the present invention, the filler material 64 is provided at substantially the center of the extensions 51a1, 51a2 in the direction in which the extensions 51a1, 51a2 extend (center of the joint separator 33 in the longitudinal direction). The filler material 64 may be provided in the extensions 51a1, 51a2 over a certain length in which the extensions 51a1, 51a2 extend. The filler material 64 may be provided in the portion other than the substantially central part of the extensions 51a1, 51a2 in the direction in which the extensions 51a1, 51a2 extend (e.g., ends of the extensions 51a1, 51a2 in the longitudinal direction). The filler material 64 may be provided only in one of the extensions 51a1, 51a2.

As shown in FIGS. 4 and 5, the first metal separator 30 and the second metal separator 32 of the joint separator 33 are joined together by laser welding lines 33a to 33e. The laser welding line 33a is formed around the oxygen-containing gas supply passage 34a and the bridge section 80. The laser welding line 33b is formed around the fuel gas discharge passage 38b and the bridge section 92.

The laser welding line 33c is formed around the fuel gas supply passage 38a and the bridge section 90. The laser welding line 33d is formed around the oxygen-containing gas discharge passage 34b and the bridge section 82. The laser welding line 33e is formed around the oxygen-containing gas flow field 48, the fuel gas flow field 58, the coolant flow field 66, the oxygen-containing gas supply passage 34a, the oxygen-containing gas discharge passage 34b, the fuel gas supply passage 38a, the fuel gas discharge passage 38b, the coolant supply passage 36a, the coolant discharge passage 36b, and an air release passage 94 and a coolant drain passage 98 described later, along the outer end of the joint separator 33. The first metal separator 30 and the second metal separator 32 may be joined together by brazing, instead of welding such as laser welding.

As shown in FIG. 2, the air release passage 94 and the coolant drain passage 98 extend through the first metal separator 30, the second metal separator 32, and the resin film equipped MEA 28 (resin film 46) in a separator thickness direction (stacking direction). The air release passage 94 is provided for releasing the air in the coolant. The air release passage 94 is provided at an upper corner of the power generation cell 12 at one end in the horizontal direction (indicated by the arrow B1). The coolant drain passage 98 is provided at a lower corner of the power generation cell 12 at one end in the horizontal direction (indicated by the arrow B1). It should be noted that one of the air release passage 94 and the coolant drain passage 98 may be provided at one end of the power generation cell 12 in the horizontal direction, and the other of the air release passage 94 and the coolant drain passage 98 may be provided at another end of the power generation cell 12 in the horizontal direction.

As shown in FIGS. 4 and 5, the air release passage 94 is provided above the uppermost position of the inner beads 51a, 61a. The air release passage 94 is provided above the fluid passage 34a provided at the highest position among the plurality of fluid passages 34a, 36a, 38b which are arranged vertically. In the embodiment of the present invention, the air release passage 94 has a circular shape. Alternatively, the air release passage 94 may have an oval shape or a polygonal shape.

As shown in FIG. 4, a passage bead seal 96a is formed by press forming around the air release passage 94 on the surface 30a of the first metal separator 30. The passage bead seal 96a is expanded toward the resin film 46 (FIG. 2). As shown in FIG. 5, a passage bead seal 96b is formed by press forming around the air release passage 94, on the surface 32a of the second metal separator 32. The passage bead seal 96b is expanded toward the resin film 46 (FIG. 2). The passage bead seals 96a, 96b have a circular shape in a plan view.

Figure 6:
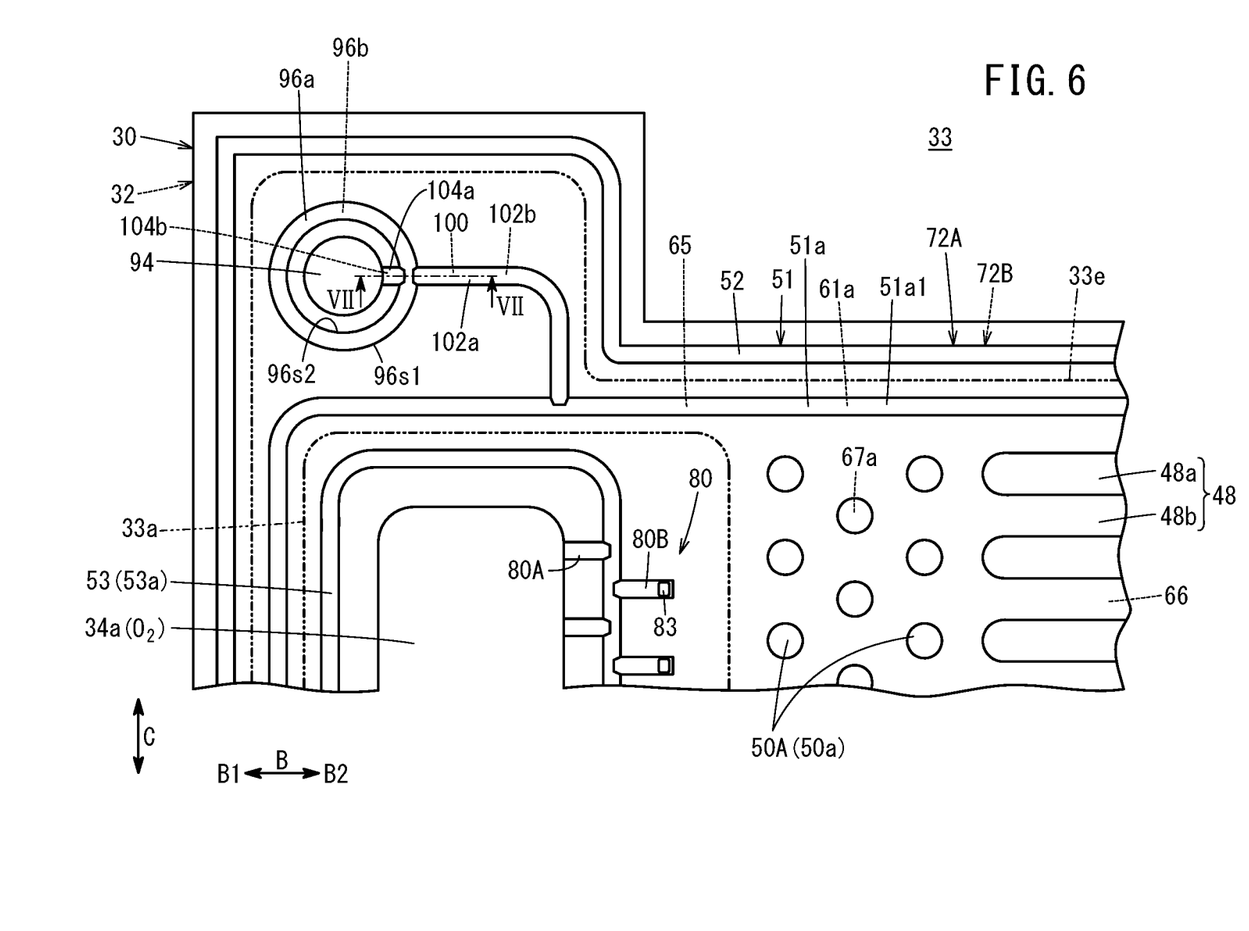
FIG. 6 is a view showing an air release passage of the joint separator and an area around the air release passage.
Figure 7:
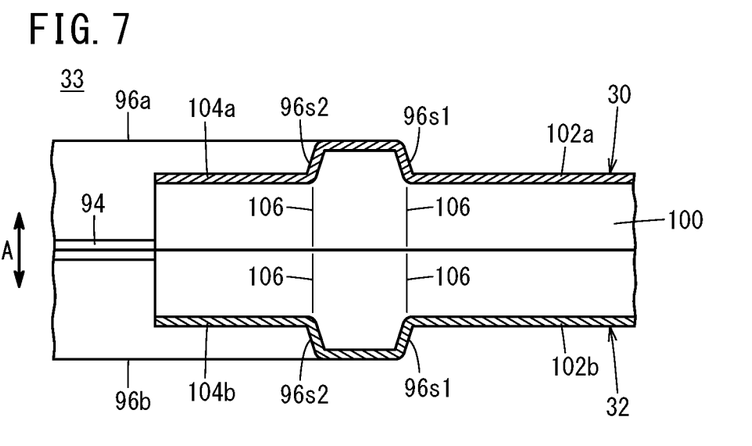
FIG. 7 is a cross sectional view taken along a line VII-VII in FIG. 6.

As shown in FIGS. 6 and 7, the air release passage 94 is connected to the coolant flow field 66 through a first connection channel 100. The first connection channel 100 is a space formed by recesses on the back of the protrusions of the first bead 72A and the second bead 72B. The first connection channel 100 connects the air release passage 94 and the internal spaces (recesses on the back) of the inner beads 51a, 61a. Therefore, the air release passage 94 is connected to the in-bead channel 65 through the first connection channel 100.

Specifically, the first bead 72A and the second bead 72B include upper connection beads 102a, 102b, and the first connection channel 100 is formed inside the upper connection beads 102a, 102b. First ends of the upper connection beads 102a, 102b are connected to the uppermost positions of the inner beads 51a, 61a, and second ends (other ends than the first ends) of the upper connection beads 102a, 102b are connected to outer side walls 96s1 of the passage bead seals 96a, 96b.

As shown in FIG. 7, tunnels 104a, 104b are provided in the first metal separator 30 and the second metal separator 32, respectively. The tunnels 104a, 104b protrude from inner side walls 96s2 of the passage bead seals 96a, 96b toward the air release passage 94. The coolant flow field 66 and the air release passage 94 are connected to each other through the internal spaces of the inner beads 51a, 61a, the internal spaces of the upper connection beads 102a, 102b (first connection channel 100), the internal space of the passage bead seals 96a, 96b, and the internal spaces of the tunnels 104a, 104b. It should be noted that only one of the upper connection beads 102a, 102b may be provided, and only one of the tunnels 104a, 104b may be provided.

In order to prevent bypassing of the reactant gas (bypassing of the reactant gas in the direction indicated by the arrow B) in the reactant gas flow field at the end in the flow field width direction, bypass prevention ridges may be provided by press forming, to protrude toward the resin film 46, and protrude from the inner beads 51a, 61a toward the oxygen-containing gas flow field 48 and the fuel gas flow field 58, respectively. A plurality of the bypass prevention ridges may be provided at intervals in the flow field length direction (indicated by the arrow B) of the reactant gas flow field. In this case, the recess on the back of the bypass prevention ridge form parts of a channel connecting the coolant flow field 66 and the air release passage 94.

A through hole 106 is formed in each of the inner side walls 96s2 and the outer side walls 96s1 of the passage bead seals 96a, 96b. Ends of the tunnels 104a, 104b opposite to portions of the tunnels 104a, 104b connected to the passage bead seals 96a, 96b are opened to the air release passage 94. As long as the through hole 106 is provided in the inner side wall 96s2, the tunnels 104a, 104b may be dispensed with.

The first connection channel 100 as the internal space of the upper connection beads 102a, 102b is connected to the internal space of the passage bead seals 96a, 96b through the through holes 106 provided in the outer side walls 96s1 of the passage bead seals 96a, 96b.

The protruding heights of the upper connection beads 102a, 102b and the tunnels 104a, 104b are lower than the protruding heights of the passage bead seals 96a, 96b, respectively (Likewise, the protruding heights of lower connection beads 110a, 110b and tunnels 112a, 112b described later are lower than the protruding heights of passage bead seals, respectively.). Preferably, the upper connection beads 102a, 102b are provided at positions facing the tunnels 104a, 104b through the passage bead seals 96a, 96b. However, as long as the upper connection beads 102a, 102b are connected to the tunnels 104a, 104b, the upper connection beads 102a, 102b may not be provided at positions facing the tunnels 104a, 104b.

As shown in FIG. 7, the first connection channel 100 is formed by the back side of the upper connection bead 102a provided in the first metal separator 30 and the back side of the upper connection bead 102b provided in the second metal separator 32.

As shown in FIGS. 4 and 5, the coolant drain passage 98 is provided below the lowermost positions of the inner beads 51a, 61a. The coolant drain passage 98 is provided below the fluid passage 38b provided at the lowest position among the plurality of fluid passages 34a, 36a, 38b which are arranged vertically. The coolant drain passage 98 has a circular shape. The coolant drain passage 98 may have an oval shape (not limited to the geometrically perfect oval shape, but including a substantially oval shape), an ellipse shape, or a polygonal shape.

As shown in FIG. 4, a passage bead seal 99a around the coolant drain passage 98 is formed by press forming in the surface 30a of the first metal separator 30. The passage bead seal 99a is expanded toward the resin film 46 (FIG. 2). As shown in FIG. 5, a passage bead seal 99b around the coolant drain passage 98 is formed by press forming in the surface 32a of the second metal separator 32. The passage bead seal 99b is expanded toward the resin film 46 (FIG. 2). The passage bead seals 99a, 99b have a circular shape in a plan view. The passage bead seals 99a, 99b have the same structure as the passage bead seals 96a, 96b described above.

Figure 8:
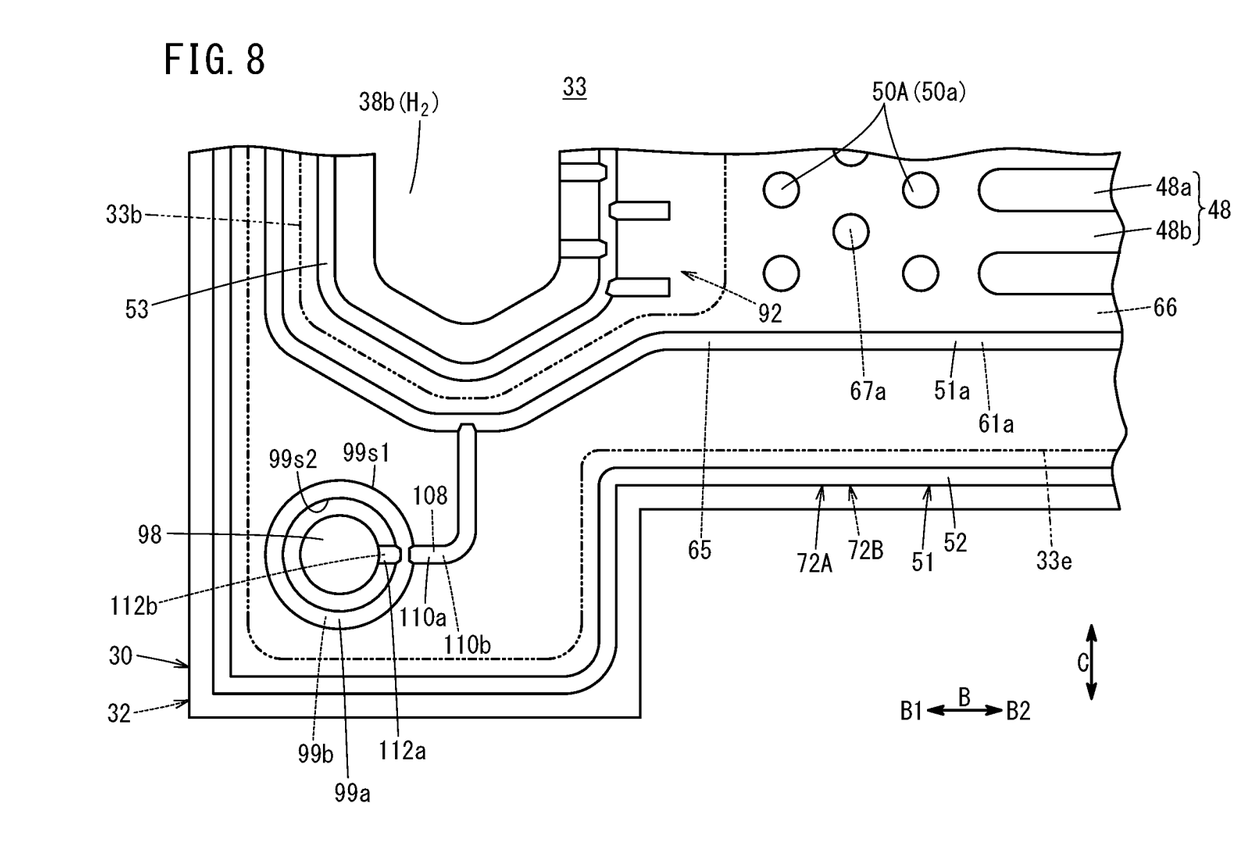
FIG. 8 is a view showing a coolant drain passage of the joint separator and an area around the coolant drain passage.

As shown in FIG. 8, the coolant drain passage 98 is connected to the coolant flow field 66 through a second connection channel 108. The second connection channel 108 is a space formed by recesses on the back of the protrusions of the first bead 72A and the second bead 72B. The second connection channel 108 connects the coolant drain passage 98 and the internal spaces of the inner beads 51a, 61a (recesses 51b, 61b on the back of the inner beads 51a, 61a). Therefore, the coolant drain passage 98 is connected to the in-bead channel 65 through the second connection channel 108.

Specifically, the first bead 72A and the second bead 72B include the lower connection beads 110a, 110b. The second connection channel 108 is formed inside the lower connection beads 110a, 110b. Only one of the lower connection beads 110a, 110b may be provided.

The second connection channel 108 is formed by the back side of the lower connection bead 110a provided in the first metal separator 30 and the back side of the lower connection bead 110b provided in the second metal separator 32.

First ends of the lower connection beads 110a, 110b are connected to the lowermost positions of the inner beads 51a, 61a, and second ends (other ends than the first ends) of the lower connection beads 110a, 110b are connected to outer side walls 99s1 of the passage bead seals 99a, 99b. The lowermost positions of the inner beads 51a, 61a are provided immediately below the fluid passage 38b at the lowest position among the plurality of fluid passages 34a, 36a, 38b which are arranged vertically.

The tunnels 112a, 112b are provided in the first metal separator 30 and the second metal separator 32, respectively.

The tunnels 112a, 112b protrude from inner side walls 99s2 of the passage bead seals 99a, 99b toward the coolant drain passage 98. The coolant flow field 66 and the coolant drain passage 98 are connected to each other through the internal spaces of the inner beads 51a, 61a, the internal spaces of the lower connection beads 110a, 110b (second connection channel 108), the internal spaces of the passage bead seals 99a, 99b, and the internal spaces of the tunnels 112a, 112b. As long as the through hole is provided inside the inner side walls 99s2 of the passage bead seals 99a, 99b, the tunnels 112a, 112b may be dispensed with.

Operation of the fuel cell stack 10 having the above structure will be described below.

Firstly, as shown in FIG. 1, an oxygen-containing gas such as air is supplied to the oxygen-containing gas supply passage 34a of the end plate 20a. A fuel gas such as a hydrogen-containing gas is supplied to the fuel gas supply passage 38a of the end plate 20a. Coolant such as pure water, ethylene glycol, oil is supplied to the coolant supply passage 36a of the end plate 20a.

As shown in FIG. 2, the oxygen-containing gas flows from the oxygen-containing gas supply passage 34a to the oxygen-containing gas flow field 48 of the first metal separator 30 through the bridge section 80 (see FIG. 4). Then, as shown in FIG. 1, the oxygen-containing gas flows along the oxygen-containing gas flow field 48 in the direction indicated by the arrow B, and the oxygen-containing gas is supplied to the cathode 44 of the membrane electrode assembly 28a.

In the meanwhile, the fuel gas flows from the fuel gas supply passage 38a into the fuel gas flow field 58 of the second metal separator 32 through the bridge section 90. The fuel gas flows along the fuel gas flow field 58 in the direction indicated by the arrow B, and the fuel gas is supplied to the anode 42 of the membrane electrode assembly 28a.

Thus, in each of the membrane electrode assemblies 28a, the oxygen-containing gas supplied to the cathode 44 and the fuel gas supplied to the anode 42 are partially consumed in electrochemical reactions in the first electrode catalyst layer 44a and the second electrode catalyst layer 42a to generate electricity.

Then, after the oxygen-containing gas supplied to the cathode 44 is partially consumed at the cathode 44, the oxygen-containing gas flows from the oxygen-containing gas flow field 48 through the bridge section 82 (FIG. 4) to the oxygen-containing gas discharge passage 34b, and the oxygen-containing gas is discharged along the oxygen-containing gas discharge passage 34b in the direction indicated by the arrow A. Likewise, after the fuel gas supplied to the anode 42 is partially consumed at the anode 42, the fuel gas flows from the fuel gas flow field 58 through the bridge section 92 to the fuel gas discharge passage 38b, and the fuel gas is discharged along the fuel gas discharge passage 38b in the direction indicated by the arrow A.

Further, the coolant supplied to the coolant supply passage 36a flows into the coolant flow field 66 between the first metal separator 30 and the second metal separator 32, and then, the coolant flows in the direction indicated by the arrow B. After the coolant cools the membrane electrode assembly 28a, the coolant is discharged from the coolant discharge passage 36b.

In this case, the fuel cell stack 10 according to the embodiment of the present invention offers the following advantages.

In the first and second metal separators 30, 32 having the above structure, since the narrowed segment 65a is provided in a part of the in-bead channel 65 formed on the back sides of the bead seals 51a, 61a, it is possible to reduce the bypass flow rate of the coolant bypassing from the coolant supply passage 36a to the coolant discharge passage 36b (coolant which detours without passing through the coolant flow field 66). In the structure, it is possible to increase the flow rate of the coolant flowing through the coolant flow field 66, and cools the heat generating area efficiently. Further, since the cooling efficiency is improved, size reduction of the cooling system is achieved.

The narrowed segment 65a is formed by filling the filler material 64 in a part of the in-bead channel 65. In the structure, it is possible to provide the narrowed segment 65a in the in-bead channel 65 easily.

The inner bead 51a (inner bead 61a) includes the pair of extensions 51a1, 51a2 (pair of extensions 61a1, 61a2) extending in the flow field direction of the reactant gas flow field at both ends of the first metal separator 30 (second metal separator 32) in the flow field width direction of the reactant gas flow field. In this regard, the filler material 64 forming the narrowed segment 65a is provided on the back side of each of the pair of extensions. In the structure, it is possible to effectively reduce the bypass flow rate of the coolant bypassing from the coolant supply passage 36a to the coolant discharge passage 36b to a greater extent.

The in-bead channel 65 is connected to the air release passage 94 extending through the separator in the separator thickness direction. In the structure, the in-bead channel 65 can be utilized as an air release channel.

The in-bead channel 65 is connected to the coolant drain passage 98 extending through the separators in the separator thickness direction. In the structure, the in-bead channel 65 can be utilized as a coolant drain channel.

The ratio of the cross sectional area of the filler material 64 to the cross sectional area of the in-bead channel 65 in the state where no tightening load is applied to the joint separator 33 is determined in a manner that the in-bead channel 65 is not closed by the narrowed segment 65a in the state where the tightening load is applied. In the case where the ratio of the cross sectional area of the filler material 64 to the cross sectional area of the in-bead channel 65 in the state where no tightening load is applied to the joint separator 33 is not more than 70%, even if the tightening load is applied to the joint separator 33, since the narrowed segment 65a does not close the in-bead channel 65, the air and the coolant can pass through the narrowed segment 65a of the in-bead channel 65 smoothly. Thus, the in-bead channel 65 can suitably carry out the function of the air release channel and the function of the coolant drain channel.

In the case where the ratio of the cross sectional area of the filler material 64 to the cross sectional area of the in-bead channel 65 in the state where no tightening load is applied to the joint separator 33 is not less than 40%, it is possible to effectively reduce the bypass flow rate of the coolant bypassing from the coolant supply passage 36a to the coolant discharge passage 36b. Therefore, preferably, the above ratio is in the range between 40% and 70%.

The present invention is not limited to the above described embodiment. Various modifications may be made without departing from the gist of the present invention.

What is claimed is:

1. A fuel cell metal separator comprising a first separator plate and a second separator plate which are joined together, wherein
   a reactant gas flow field, as a passage for a reactant gas comprising a fuel gas or an oxygen-containing gas, and
   a ridge shaped bead seal around the reactant gas flow field configured to prevent leakage of the reactant gas, are formed on one surface of the fuel cell metal separator, a coolant flow field, as a passage for a a coolant, is formed on another surface of the fuel cell metal separator, a coolant supply passage is connected to the coolant flow field and a coolant discharge passage is connected to the coolant flow field, the coolant supply passage and the coolant discharge passage extend through the fuel cell metal separator in a separator thickness direction, and an in-bead channel, as a passage for receiving the coolant, is formed by a recess on a back side of a ridge shape of the bead seal, each of the first and second separator plates containing part of said recess, and wherein:

the in-bead channel is configured to connect the coolant supply passage and the coolant discharge passage, and a narrowed segment, having a channel cross sectional area smaller than those of other segments, is formed in a part of the in-bead channel, the narrowed segment formed by filling a filler material in the part of the in-bead channel, the recess in the first separator plate forms a first recess part and the recess in the second separator plate forms a second recess part, the filler material is filled in the first recess part but is not filled in the second recess part, and the filler material is out of contact with the second separator plate.

2. The fuel cell metal separator according to claim 1, wherein a ratio of a cross sectional area of the filler material to a cross sectional area of the in-bead channel is not more than 70%.

3. The fuel cell metal separator according to claim 1, wherein the bead seal includes a pair of extensions extending in a flow field direction of the reactant gas flow field, at both ends of the fuel cell metal separator in a flow field width direction of the reactant gas flow field, and the narrowed segment is provided on a back side of each of the pair of extensions.

4. The fuel cell metal separator according to claim 1, wherein the in-bead channel is connected to an air release passage extending through the fuel cell metal separator in the separator thickness direction.

5. The fuel cell metal separator according to claim 1, wherein the in-bead channel is connected to a coolant drain passage extending through the fuel cell metal separator in the separator thickness direction.

6. The fuel cell metal separator according to claim 1, wherein the coolant flow field is provided between the coolant supply passage and the coolant discharge passage, and in the in-bead channel, the narrowed segment is provided in a part extending along the coolant flow field.

7. A fuel cell comprising:

a membrane electrode assembly; and fuel cell metal separators provided on opposite sides of the membrane electrode assembly, each of the fuel cell metal separators comprising a first separator plate and a second separator plate which are joined together, wherein, in each of the fuel cell metal separators, a reactant gas flow field, as a passage for a reactant gas comprising a fuel gas or an oxygen-containing gas, and a ridge shaped bead seal around the reactant gas flow field configured to prevent leakage of the reactant gas, are formed on one surface of the fuel cell metal separator, a coolant flow field, as a passage for a a coolant, is formed on another surface of the fuel cell metal separator, a coolant supply passage is connected to the coolant flow field and a coolant discharge passage is connected to the coolant flow field, the coolant supply passage and the coolant discharge passage extend through the fuel cell metal separator in a separator thickness direction, and an in-bead channel, as a passage for receiving the coolant, is formed by a recess on a back side of a ridge shape of the bead seal, each of the first and second separator plates containing part of said recess, and wherein:

the in-bead channel is configured to connect the coolant supply passage and the coolant discharge passage, and a narrowed segment having a channel cross sectional area smaller than those of other segments is formed in a part of the in-bead channel, the narrowed segment formed by filling a filler material in the part of the in-bead channel, the recess in the first separator plate forms a first recess part and the recess in the second separator plate forms a second recess part, the filler material is filled in the first recess part but is not filled in the second recess part, and the filler material is out of contact with the second separator plate.

8. The fuel cell metal separator according to claim 1, wherein portions of the first and second separator plates on both sides of the bead seal, and immediately adjacent the bead seal, are in abutting contact with one another.

9. The fuel cell according to claim 7, wherein portions of the first and second separator plates on both sides of the bead seal, and immediately adjacent the bead seal, are in abutting contact with one another.

* * * * *

UNITED STATES PATENT AND TRADEMARK OFFICE
CERTIFICATE OF CORRECTION

PATENT NO. : 11,189,848 B2  
APPLICATION NO. : 16/191972  
DATED : November 30, 2021  
INVENTOR(S) : Kentaro Ishida and Hiroshi Morikawa Page 1 of 1

It is certified that error appears in the above-identified patent and that said Letters Patent is hereby corrected as shown below:

In the Claims

Column 16:
Line 16, change "fora" to --for--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*